US008432575B2

(12) United States Patent
Hashimoto

(10) Patent No.: US 8,432,575 B2
(45) Date of Patent: Apr. 30, 2013

(54) IMAGE PROCESSING APPARATUS AND METHOD FOR PROPERLY SCALING AN IMAGE INCLUDING A TINT IMAGE

(75) Inventor: Masaya Hashimoto, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1063 days.

(21) Appl. No.: 11/277,586

(22) Filed: Mar. 27, 2006

(65) Prior Publication Data

US 2007/0097384 A1 May 3, 2007

(30) Foreign Application Priority Data

Oct. 31, 2005 (JP) ................................ 2005-317765

(51) Int. Cl.
*G06K 15/02* (2006.01)
*H04N 1/393* (2006.01)
*H04N 1/387* (2006.01)

(52) U.S. Cl.
USPC ............................ 358/1.2; 358/451; 358/453

(58) Field of Classification Search .................. None
See application file for complete search history.

(56) References Cited

U.S. PATENT DOCUMENTS

| 5,206,689 | A * | 4/1993 | Kusuda ............................ 399/14 |
| 5,864,742 | A | 1/1999 | Gasper et al. |
| 6,414,757 | B1 | 7/2002 | Salem |
| 6,745,334 | B1 | 6/2004 | Ikegami |
| 6,801,671 | B1 | 10/2004 | Suzuki et al. |
| 6,901,236 | B2 | 5/2005 | Saitoh |
| 7,006,660 | B2 | 2/2006 | Hayashi |
| 2001/0030759 | A1 * | 10/2001 | Hayashi et al. ................. 358/1.9 |
| 2002/0002679 | A1 * | 1/2002 | Murakami et al. ............ 713/176 |
| 2002/0054317 | A1 | 5/2002 | Matsunoshita et al. |
| 2004/0148507 | A1 | 7/2004 | Iwamura et al. |
| 2005/0058476 | A1 | 3/2005 | Murakami |
| 2005/0078993 | A1 | 4/2005 | Oomura et al. |
| 2005/0088701 | A1 * | 4/2005 | Uchida et al. ................. 358/3.28 |
| 2005/0190411 | A1 * | 9/2005 | Ohno ............................ 358/3.28 |
| 2008/0137903 | A1 * | 6/2008 | Nakamura et al. ............ 382/100 |

FOREIGN PATENT DOCUMENTS

| JP | 02012570 A * | 1/1990 |
| JP | 2002-077571 A | 3/2002 |
| JP | 2003-189088 A | 7/2003 |
| JP | 2004-228897 A | 8/2004 |

(Continued)

OTHER PUBLICATIONS

JP-2003189088-translation, Hayashi, Jul. 4, 2003.*

(Continued)

*Primary Examiner* — Fan Zhang
(74) *Attorney, Agent, or Firm* — Buchanan Ingersoll & Rooney PC

(57) ABSTRACT

Disclosed are an image processing apparatus, an image processing method, and a transmitting apparatus that can inhibit an inappropriate printing process when performing scaling of an image including a tint image. In the case of performing scaling of image data including a tint image in which concealed characters that appear when scanning the image are embedded, and printing the image data with a printer unit, it is judged whether there is a possibility that the form of the tint image will be inappropriate when the scaling is performed with a scaling factor acquired by a scaling factor acquiring unit. If it is judged that the form of the tint image will be inappropriate, control is carried out such that processing that is different from that performed otherwise is performed.

17 Claims, 19 Drawing Sheets

FOREIGN PATENT DOCUMENTS

| | | | |
|---|---|---|---|
| JP | 2005-12623 A | | 1/2005 |
| JP | 2005-091730 A | | 4/2005 |
| JP | 2005-136953 A | | 5/2005 |
| JP | 2005223690 A | * | 8/2005 |
| JP | 2006-173909 | | 6/2006 |

OTHER PUBLICATIONS

Japanese Office Action dated Nov. 13, 2007 and English language translation.

Notification of Grounds for Rejection in JP 2005-317765 dated Feb. 12, 2008, and Translation thereof.

Sakai, Hiroshi, U.S. Appl. No. 11/192,100, entitled, "Information Processing Apparatus, Control Method and Control Program for Registration of Information Related to Ground Tint", filed Jul. 29, 2005.

* cited by examiner

Fig. 6

| TINT IMAGE IDENTIFIERS | TINT IMAGE PATTERNS |
|---|---|
| SECRET | SECRET |
| COPYITA | COPY |
| COPY | COPY |
| ⋮ | ⋮ |

Fig. 16A

REGISTERED USER INFORMATION OF MFP100

| NO. | USER ID | PERSONAL USER INFORMATION | | | | |
|---|---|---|---|---|---|---|
| | | ACCOMPANYING INFORMATION A | ADDRESS BOOK A | PANEL SETTING INFORMATION A | AUTHENTICATION INFORMATION A | HISTORY INFORMATION A |
| 1 | DAVID | | | | | |

Fig. 16B

REGISTERED USER INFORMATION OF MFP100A

| NO. | USER ID | PERSONAL USER INFORMATION | | | | |
|---|---|---|---|---|---|---|
| | | ACCOMPANYING INFORMATION B | ADDRESS BOOK B | PANEL SETTING INFORMATION B | AUTHENTICATION INFORMATION B | HISTORY INFORMATION B |
| 2 | JULIE | | | | | |

Fig. 16C

REGISTERED USER INFORMATION OF MFP100B

| NO. | USER ID | PERSONAL USER INFORMATION | | | | |
|---|---|---|---|---|---|---|
| | | ACCOMPANYING INFORMATION C | ADDRESS BOOK C | PANEL SETTING INFORMATION C | AUTHENTICATION INFORMATION C | HISTORY INFORMATION C |
| 3 | MICHAEL | | | | | |
| 4 | SUSAN | ACCOMPANYING INFORMATION D | ADDRESS BOOK D | PANEL SETTING INFORMATION D | AUTHENTICATION INFORMATION D | HISTORY INFORMATION D |

Fig. 17

| NO. | USER ID | PERSONAL USER INFORMATION |||||| HOME TERMINAL |
| --- | --- | --- | --- | --- | --- | --- | --- |
| | | ACCOMPANYING INFORMATION | ADDRESS BOOK | PANEL SETTING INFORMATION | AUTHENTICATION INFORMATION | HISTORY INFORMATION | |
| 1 | DAVID | ACCOMPANYING INFORMATION A | ADDRESS BOOK A | PANEL SETTING INFORMATION A | AUTHENTICATION INFORMATION A | HISTORY INFORMATION A | IP ADDRESS OF MFP 100 |
| 2 | JULIE | ACCOMPANYING INFORMATION B | ADDRESS BOOK B | PANEL SETTING INFORMATION B | AUTHENTICATION INFORMATION B | HISTORY INFORMATION B | IP ADDRESS OF MFP100A |
| 3 | MICHEAL | ACCOMPANYING INFORMATION C | ADDRESS BOOK C | PANEL SETTING INFORMATION C | AUTHENTICATION INFORMATION C | HISTORY INFORMATION C | IP ADDRESS OF MFP100B |
| 4 | SUSAN | ACCOMPANYING INFORMATION D | ADDRESS BOOK D | PANEL SETTING INFORMATION D | AUTHENTICATION INFORMATION D | HISTORY INFORMATION D | IP ADDRESS OF MFP100B |

IMAGE PROCESSING APPARATUS AND METHOD FOR PROPERLY SCALING AN IMAGE INCLUDING A TINT IMAGE

CROSS REFERENCE OF RELATED APPLICATION

This application is based on the Japanese Patent Application No. 2005-317765 filed on Oct. 31, 2005, the content of which is hereby incorporated by reference.

Reference is hereby made to co-pending U.S. patent application Ser. No. 11/192,100 filed on Jul. 29, 2005, the entire disclosure of which is incorporated by reference.

BACKGROUND OF THE INVENTION

1. Field of the Invention

The present invention relates to an image processing apparatus, an image processing method, and a transmitting apparatus, and particularly to a technique for performing scaling of image data including a tint image in which concealed characters appearing after scanning of the image are embedded.

2. Description of Related Art

A technique for printing a tint image whose output appearance changes when copied in such a manner that characters such as "COPY" appear on a copied sheet is disclosed in JP2005-136953A, for example. The above-described characters such as "COPY" are called concealed characters, which appear on a copied sheet, but are usually printed such that they cannot be recognized with a casual glance. These concealed characters can be realized, for example, by taking advantage of the reproducibility of an image when copying the image that depends on the difference between the printing resolution and the scanning resolution of a scanner scanning the image. For example, when a background area, which is an area other than the above-described concealed character area, is not reproduced after copying, and only the concealed character area is reproduced after copying, then the above-described concealed characters appear in the copied image.

SUMMARY OF THE INVENTION

In the case of printing an image including a tint image as described above, there is a demand for printing images after performing enlarging or reducing (hereinafter, both are collectively referred to as "scaling") of the images. However, when a tint image is printed after performing scaling of the image with a requested scaling factor, the form of the tint image has been changed, so that there is a problem in that the concealed characters may not appropriately appear (e.g. an area that is to be disappeared may not disappear) when the printed tint image is copied, for example.

There is also a problem in that when the tint image is printed after scaling, the concealed characters, which should be essentially printed such that they cannot be recognized with a casual glance, may appear to such a extent that they can be recognized, thus making it unable to ensure an incognizability of concealed characters.

The present invention was made in view of the above-described problems, and it is an object of the present invention to provide an image processing apparatus, an image processing method, and a transmitting apparatus that can inhibit an inappropriate printing process when performing scaling of an image including a tint image.

In order to address the above-described problems, an image processing apparatus according to the present invention includes: printing equipment that prints an image on a recording sheet; an image data scaling circuit that scales image data and outputs the scaled image data to the printing equipment; a scaling factor acquiring unit that acquires a scaling factor specified for scaling performed by the image data scaling circuit; a scaling appropriateness judging unit that judges, when image data including a tint image in which a concealed character appears from its background area after scanning is subjected to scaling with the scaling factor, whether there is a possibility that the form of the tint image will be inappropriate; and an image data processing controller that, if the scaling appropriateness judging unit judges that there is a possibility that the form of the tint image will be inappropriate, switches details of processing before printing processing of the printing equipment is performed.

With the configuration of the present invention, if it is judged that there is the possibility that the form of the tint image will be inappropriate, the details of the controlling process are switched to those used otherwise, so that it is possible to prevent problems that could occur if the form of the tint image is inappropriate.

It should be noted that "case where the form of the tint image will be inappropriate" includes a case (first case) where there is the possibility that the concealed characters will not appropriately appear (e.g. the background area does not appropriately disappear) when an image that has been printed after scaling is scanned with a scanner or the like, and a case (second case) where the concealed characters, whose appearance should be essentially such that they cannot be recognized with a casual glance, are recognized when the image is printed after scaling. Since the conditions under which the second case occurs and those under which the first case occurs may differ, it is of course preferable to make a judgment for both cases, but it is possible to make a judgment for one of the two set of conditions. In the case of making a judgment for the second case, it is possible to judge whether there is the possibility that the concealed characters will appear, based on the densities of the background area and the concealed character area of a tint image, or the appearance of the boundary between these two areas, for example.

Additionally, the scaling appropriateness judging unit may be configured to judge whether there is the possibility that the concealed characters will not appropriately appear when a printed image is scanned after being subjected to scaling. In this case, it is more preferable to judge whether there is the possibility that the tint image will not appropriately appear when image data obtained by scanning an image including the tint image is scanned, regardless of whether the image has been copied or not.

A transmitting apparatus for transmitting image data to an image processing apparatus according to the present invention includes: a function information acquiring unit that acquires information relating to whether a destination image processing apparatus is provided with a tint image combining function, the tint image combining function being a function that generates image data by combining a tint image data previously prepared in the destination image processing apparatus and the data transmitted from the transmitting apparatus; and an image transmission controller that switches details of image data that are to be transmitted to the destination image processing apparatus, based on the information acquired by the function information acquiring unit.

It is preferable that, if the destination image processing apparatus is provided with the tint image combining function, the function information acquiring unit further acquires information relating to a type of the tint image that can be combined, and that the image transmission controller includes a separating unit that separates data of the tint image from image data that is to be transmitted, if the tint image included in the image data that is to be transmitted can be combined at the destination image processing apparatus.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a diagram illustrating the details of a tint image storing unit 232.

FIG. 16 is a diagram illustrating registered user information.

FIG. 17 is a diagram showing an example of user data.

DETAILED DESCRIPTION OF THE INVENTION

Hereinafter, embodiments of the present invention will be described with reference to the accompanying drawings.

Embodiment 1

(1-1) Configuration of Image Forming System

Figure 1:
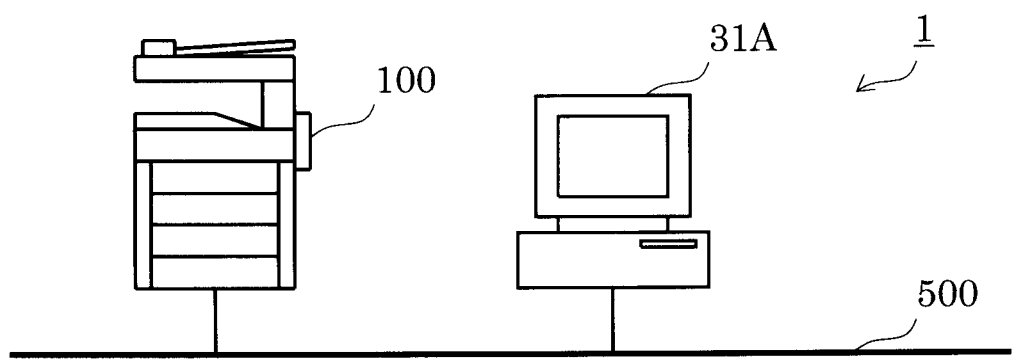
FIG. 1 is a diagram showing an example of the overall configuration of an image forming system according to a first embodiment of the present invention.

FIG. 1 is a diagram showing an example of the overall configuration of an image forming system according to this embodiment. An image forming system 1 is configured by connecting an MFP (Multifunction Peripheral) 100, which is an example of an image processing apparatus, and a personal computer (PC) 31A, which is an example of a print job transmitting apparatus, via a network 500 such as a LAN. The MFP 100 is a printing device in which, for example, copier, network printer and scanner functions, as well as a facsimile or document server function are integrated. The MFP 100 is also called a multifunction device, for example.

Any given number of MFPs and PCs may be connected. As the protocol or communication standard of the communication network 500, it is possible to use, for example, TCP/IP, FTP, IEEE 802.3, which is the standard for wired LANs, or IEEE 802.11, which is the standard for wireless LANs.

On the PC 31A, a print instruction program is installed, which instructs the MFP 100 to print, for example, a document created with software such as a word processing application installed on the PC 31A. Further, the MFP 100 according to this embodiment is provided with, for example, a function called a "tint image combining function" or the like. This "tint image combining function" is a function for combining image data generated from image data information that expresses characters or diagrams for example (not including a tint image) with a tint image, and generating the resulting image. In this embodiment, it is possible to combine a tint image that has been already stored in the MFP 100 with an image transmitted from the PC 31A and including no tint image, and to print the resulting image.

(1-2) Configuration of MFP 100

Figure 2:
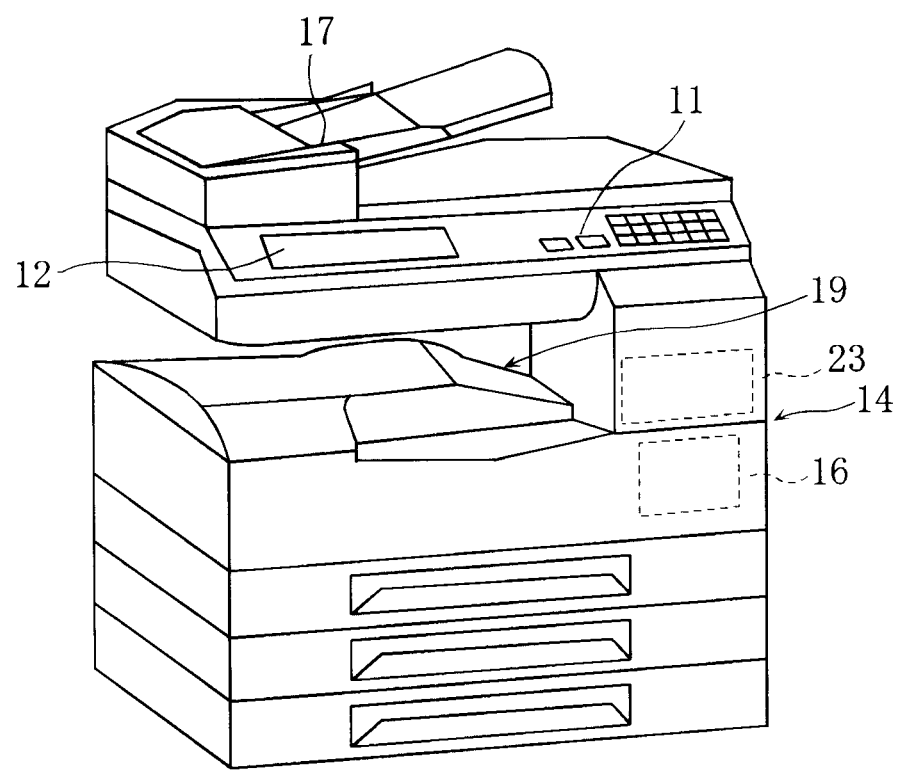
FIG. 2 is a diagram showing an example of the outer appearance of an MFP.
Figure 3:
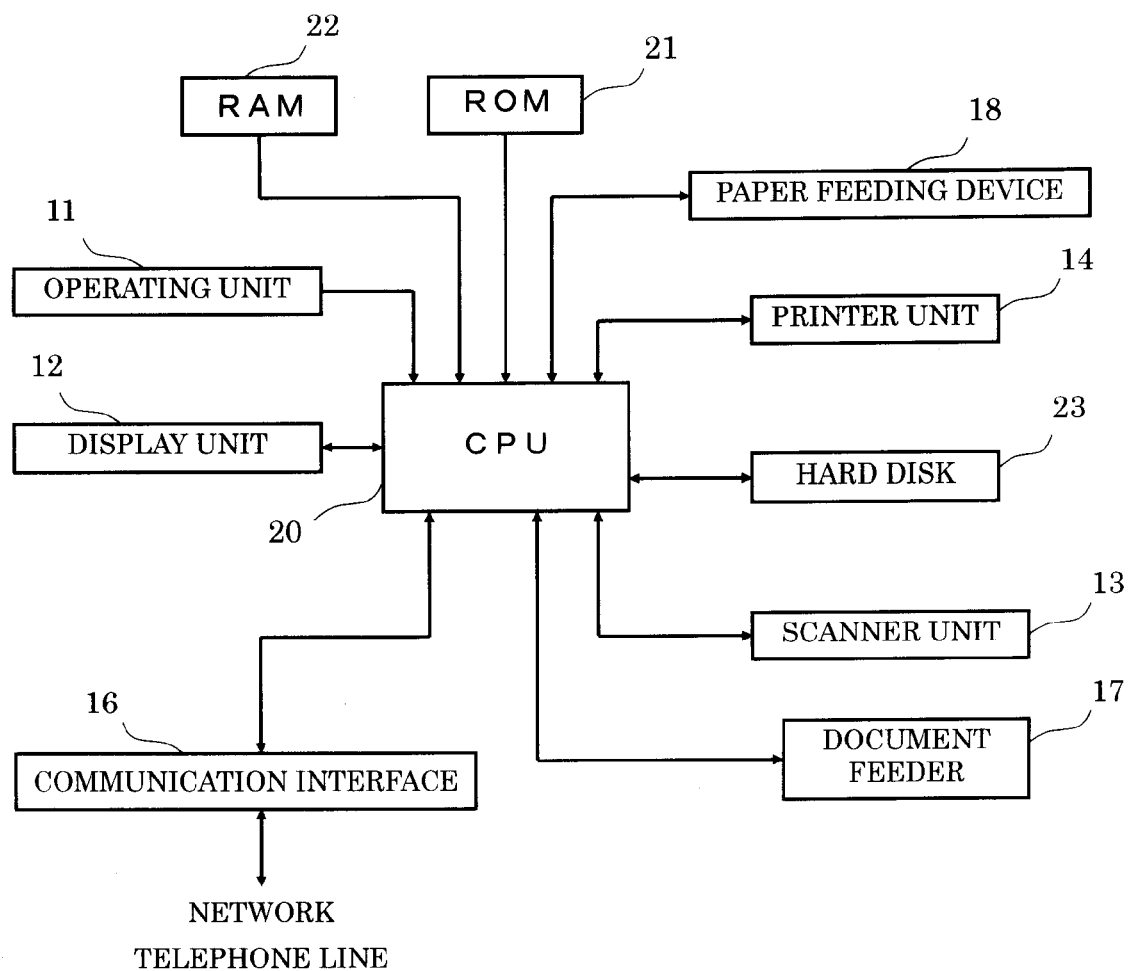
FIG. 3 is a diagram showing an example of the hardware configuration in the MFP.

FIG. 2 is a diagram showing an example of the appearance of the MFP 100 according to this embodiment, as an example of an image processing apparatus. FIG. 3 is a diagram showing an example of the hardware configuration in the MFP 100 according to this embodiment. The MFP 100 includes, for example, an operating unit 11, a display unit 12, a scanner unit 13, a printer unit 14, a communication interface 16, a document feeder 17, a paper feeding device 18, a tray 19 (see FIG. 2), a CPU 20, a ROM 21, a RAM 22, and a hard disk 23.

The operating unit 11 includes, for example, a plurality of keys for inputting numbers, characters, symbols and the like, a sensor that recognizes any key pressed, and a transmitting circuit that transmits a signal indicating any key recognized to the CPU 20.

The display unit 12 displays, for example, a screen that displays messages to a user, a screen on which a user inputs the details of settings and processes, and a screen that displays results of processes performed with the MFP 100. In this embodiment, a touch panel is attached to the display unit 12. The touch panel is provided with a function for detecting positions on the touch panel that are touched by user's fingers, and transmitting signals indicating the results of the detection to the CPU 20. The touch panel is included in the operating unit 11.

The scanner unit 13 throws light on an original and scans images at a predetermined scanning resolution, and generates digital image data (here, density data representing the density of RGB or black). The thus obtained image data is used in the printer unit 14 for printing, and also stored in the hard disk 23 after being converted into a file in a TIFF, PDF, or JPEG format, for example. The image data may be converted into facsimile data, and outputted for facsimile transmission. The scanning resolution may also be set in accordance with a user instruction. The document feeder 17 is provided above the body of the MFP 100, and used for successively transporting a single or a plurality of sheets of originals to the scanner unit 13.

The printer unit 14 prints an image that has been scanned with the scanner unit 13, an image of data that has been transmitted from an external apparatus, such as a PC (personal computer), connected to the MFP 100 via a network such as a LAN, or an image of facsimile data received by fax, on a recording sheet such as paper or a film. The paper feeding device 18 is provided below the body of the MFP 100, and used for feeding a recording sheet suitable for an image that is to be printed to the printer unit 14. The recording sheet on which the image is printed with the printer unit 14 is ejected onto the tray 19.

The communication interface 16 is a device for communicating with an external apparatus such as a PC via a network, or performing, for example, facsimile transmission and reception via a telephone line. As the communication interface 16, it is possible to use, for example, a NIC (network interface card), a modem or a TA (terminal adaptor).

Figure 4:
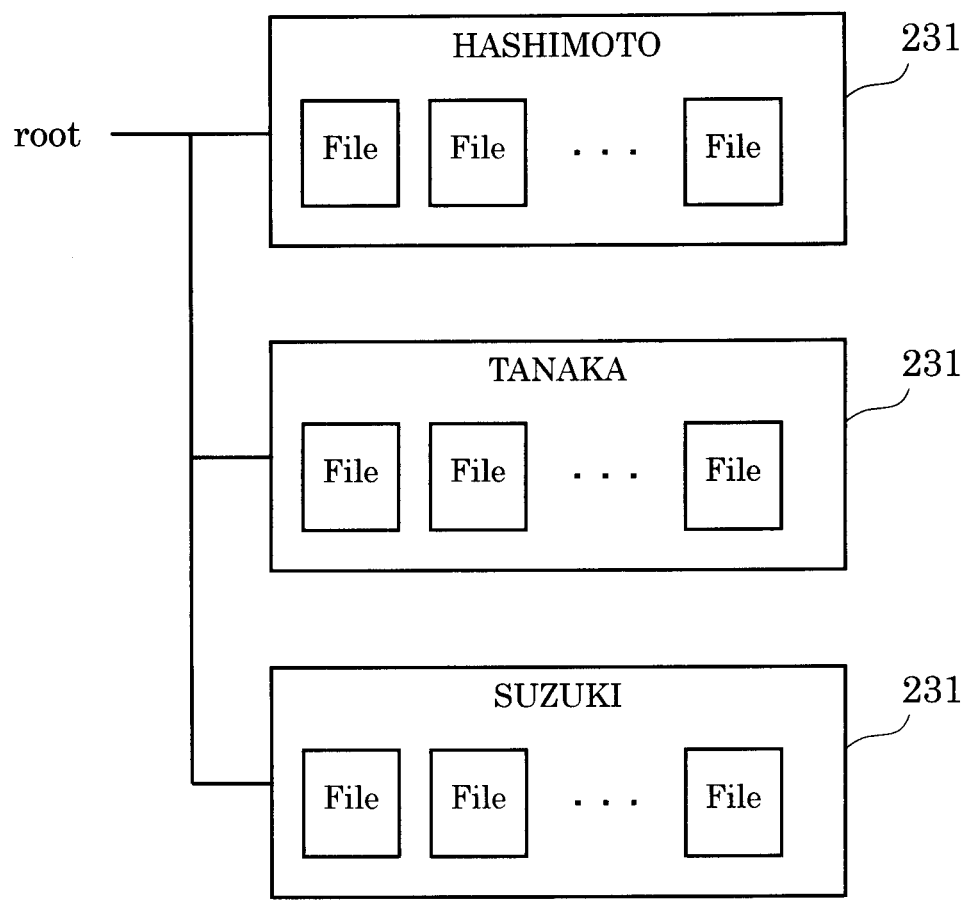
FIG. 4 is a diagram illustrating personal boxes 231 provided in a hard disk.

In the hard disk 23, a personal box 231, which is a storage area for storing data files, is allocated to each user, as shown in FIG. 4. The personal box 231 corresponds to a "directory" or "folder" in a PC or a work station. Hereinafter, the personal box 231 is simply referred to as "box 231". A box 231 is associated with a box name for distinguishing that box 231 from other boxes 231. In this embodiment, the user name of a user using a box is used as the box name associated with that box. The user can store a file in the box 231, for example, by transmitting the file from an external apparatus such as the PC 31A.

Referring back to FIG. 3, the ROM 21 stores a program and data for implementing the basic functions of the MFP 100, including, for example, scanning of images, copying of originals, transmission and reception of facsimile data, network printing, and a document server function (box function). In addition, the ROM 21 stores a program and data for implementing the functions described in the embodiments of the present invention. A part or the whole of this program or data may be installed on the hard disk 23. In this case, the program or data installed on the hard disk 23 is loaded into the RAM 22, as necessary. The functions described in this embodiment can be implemented not only with the CPU 20, but also with dedicated hardware. It is also possible to implement a part of the functions using a general purpose program such as an operating system (OS). Further, a nonvolatile semiconductor memory may be used as the ROM 21 or the RAM 22.

Figure 5:
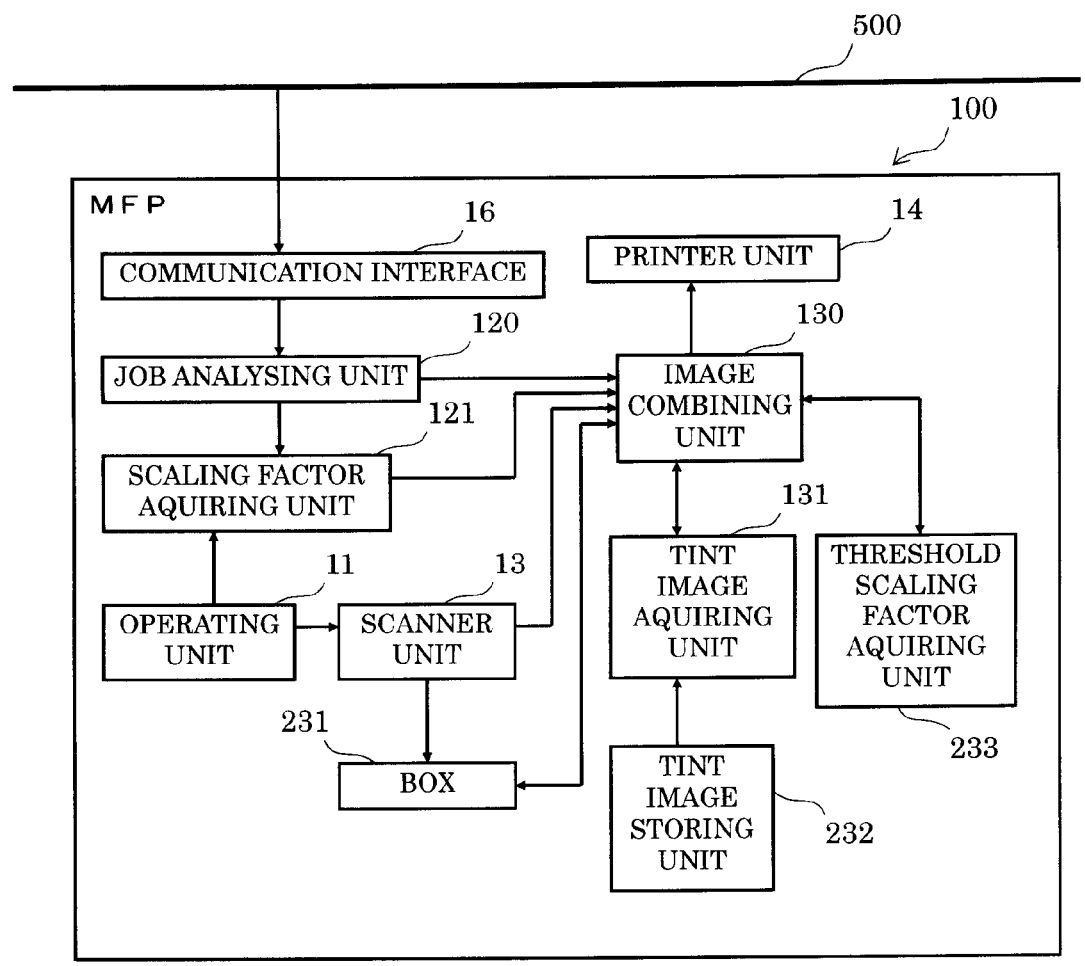
FIG. 5 is a block diagram illustrating an example of the functional configuration of the MFP according to one embodiment of the present invention.

FIG. 5 is a block diagram illustrating an example of the functional configuration of the MFP 100 according to this embodiment. The MFP 100 is provided with a job analyzing unit 120, a scaling factor acquiring unit 121, an image combining unit 130 and a tint image acquiring unit 131. The job analyzing unit 120 analyzes the details of a job submitted from an external apparatus such as the PC 31A, produces image data, and sends the image data to the image combining unit 130. In addition, if a scaling factor is specified by the external apparatus, then the job analyzing unit 120 sends that scaling factor to the scaling factor acquiring unit 121.

The scaling factor acquiring unit 121 acquires the scaling factor specified at the operating unit 11 when a job such as a print job is generated within the MFP 100, in addition to the scaling factor specified by the external apparatus as above. The scaling factor is sent to the image combining unit 130. The image combining unit 130 of this embodiment includes an image data scaling circuit that scales image data with the scaling factor. The image data scaling circuit can be constructed with a processor such as a CPU (central processing unit) or a DSP (digital signal processor) that can execute a program for scaling image data, or an ASIC (application specific integrated circuit) for scaling image data. When an instruction to combine the image data with a tint image is given from the external apparatus, or via the operating unit 11, the image combining unit 130 combines the image data with the tint image stored in the tint image storing unit 232, and provides the resulting data to the printing process in the printer unit 14. The image combining unit 130 switches the details of the above-described combining process in accordance with the scaling factor.

Additionally, the image combining unit 130 can also perform the process of combining a tint image with image data that has been scanned with the scanner unit 13 or has been sent from the external apparatus, and has been temporarily stored in the box 231 as a file in a PDF or other format, as well as combining a tint image with image data that has been obtained by scanning an original with the scanner unit 13 in accordance with an instruction from the operating unit 11. It should be noted that a tint image may be included in information transmitted from the external apparatus such as the PC 31A. In that case, the job analyzing unit 120 sends the data relating to the tint image to the image combining unit 130.

The tint image storing unit 232 may be provided within the hard disk 23, for example. The tint image storing unit 232 stores a plurality of tint image patterns, so that the tint image acquiring unit 131 can fetch a tint image in accordance with a specification by a user, and output that tint image for the combining process. FIG. 6 is a diagram illustrating the details of the tint image storing unit 232, in which tint image patterns are stored in association with the corresponding tint image identifiers. It should be noted that the tint image pattern may have various styles that are different from those shown in the drawing. That is, the tint image pattern may have any style that can be formed on a recording sheet such as recording paper at the time of printing.

After printing a tint image, if that tint image has been subjected to scaling, there may be cases where concealed characters (e.g. "COPY") may not appropriately appear at the time of scanning or copying the printed tint image. In the present specification, this performance of letting concealed characters appropriately appear is called "tint performance". When concealed characters do not appropriately appear, then this is described as "the tint performance deteriorates". Further, the upper limit of the scaling factor at which an appropriate tint performance can be maintained (the upper limit of the enlarging factor) is referred to as "upper limit scaling factor", and the lower limit of the scaling factor (the lower limit of the reducing factor) is referred to as "lower limit scaling factor". These two are collectively referred to as "threshold scaling factors".

While the threshold scaling factors may vary depending on, for example, the resolution of a tint image (the background area and the concealed character area), the density of a tint image (the background area and the concealed character area), the scanning resolution of a scanner, and the resolution of a printer, it can be experimentally determined according to the details of each parameter, for example, and stored in the threshold scaling factor storing unit 233. The threshold scaling factor storing unit 233 may be provided in the hard disk 23, for example.

It should be noted that the threshold scaling factors can be calculated dynamically in some cases. An example of the method for calculating the threshold scaling factors will be described below. When the larger of the printing resolutions of the background area and the concealed character area of a tint image is X1 (dpi), the smaller printing resolution is X2 (dpi), and the scanning resolution of a scanner is Y (dpi), then the concealed characters become recognizable if the relation of the following Expression (1) is satisfied:

$$X2 < Y < X1 \quad (1)$$

If the printing resolution of the background area is larger, then the concealed characters become recognizable when the background image disappears. If the printing resolution of the background area is smaller, the concealed characters still become recognizable, because the concealed character area disappears.

In the case where the Expression (1) works, the scaling factor R1 (upper limit scaling factor) at which the concealed characters may not appropriately appear when enlarging a tint image can be calculated using the following Expression (2). For example, assuming that the printing resolution of the background area is 600 dpi, the printing resolution of the concealed character area is 200 dpi, and the scaling factor R is 2.0, then the resolution of the background area will be 300 dpi (=600/2.0). And, because a threshold value of a scaling factor at which this value of X1/R (=600/2.0 in the above example) gets lower than the above-described Y can be considered as the upper limit scaling factor R1.

$$R1=X1/Y \quad (2)$$

On the other hand, the scaling factor R2 (lower limit scaling factor) at which the concealed characters may not appropriately appear when reducing a tint image can be calculated using the following Expression (3). For example, assuming that the printing resolution of the background area is 600dpi, the printing resolution of the concealed character area is 200 dpi, and the scaling factor R is 0.5, then the resolution of the concealed character area will be 400 dpi (=200/0.5). And, because a threshold value of a scaling factor at which this value of X2/R (=200/0.5 in the above example) tops the above-described Y can be considered as the lower limit scaling factor R2.

$$R2=X2/Y \quad (3)$$

However, the above-described method for calculating the threshold scaling factors depends on the scanning resolution of the scanner, so that it is possible to recalculate the threshold scaling factors according to other possible scanning resolution. The threshold scaling factors may be determined in the case where other conventional techniques for controlling appearing of concealed characters in a tint image are applied.

(1-3) Details of Image Combining Process (1)

Figure 7:
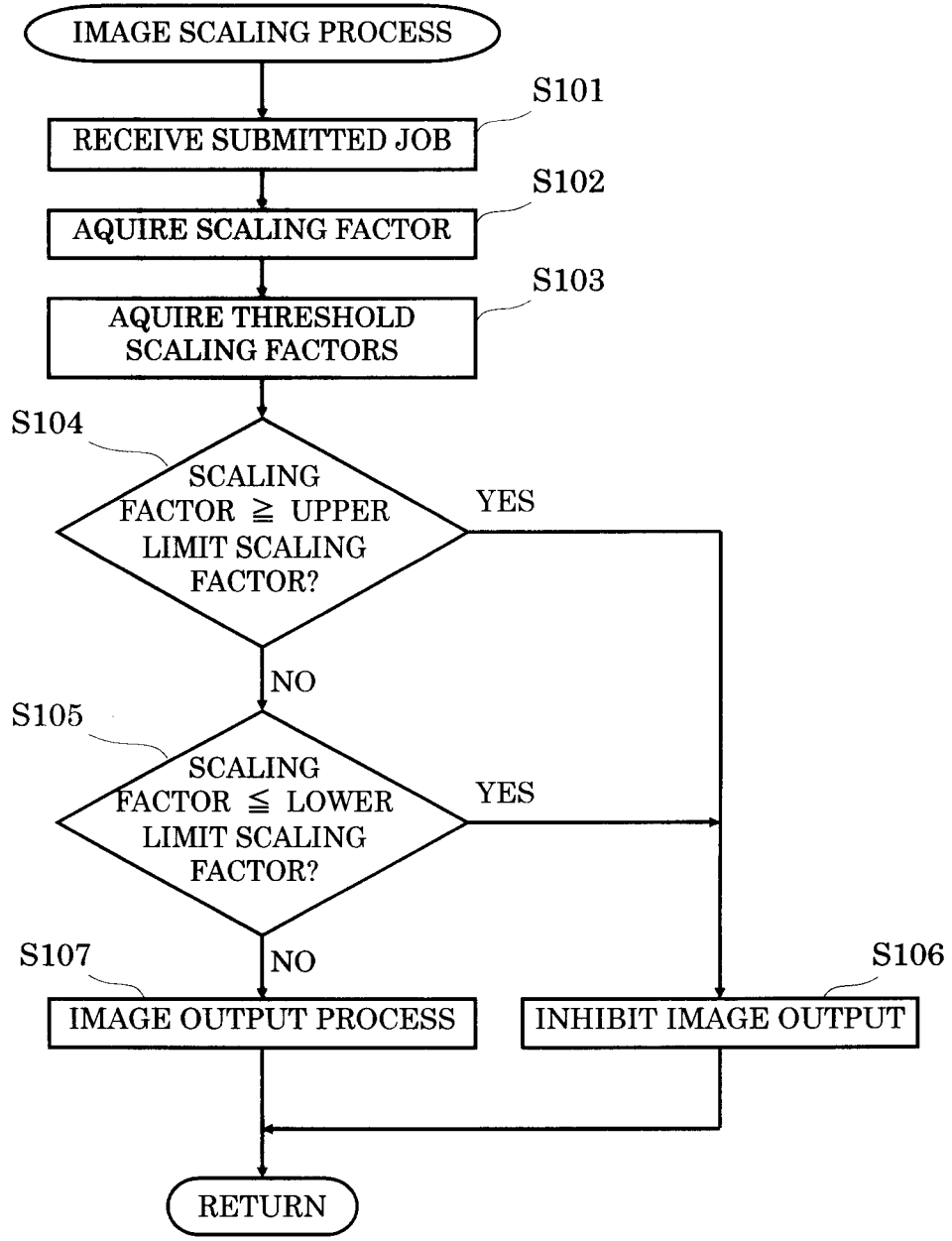
FIG. 7 is a flowchart illustrating an example of the details of an image data scaling process.

An example of the details of the process performed by the image combining unit 130 will be described below. FIG. 7 is a flowchart illustrating an example of the details of an image data scaling process in the case where, for example, the PC 31A gives a print instruction, and a job submitted from this external apparatus includes a tint image and information specifying the scaling factor.

Figure 8:
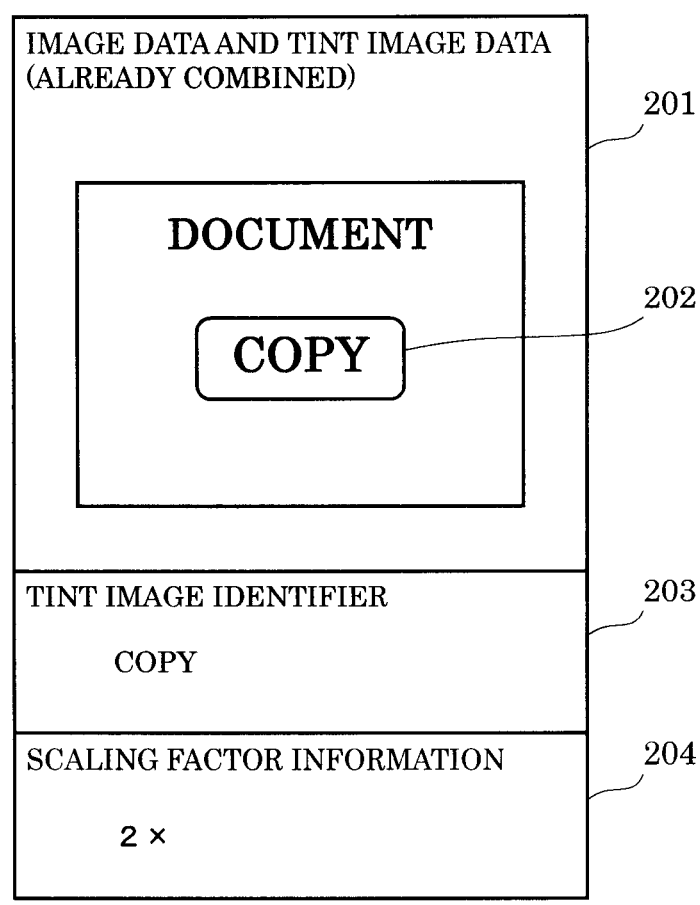
FIG. 8 is a diagram showing an example of the details of information included in a job that is submitted.

FIG. 8 is a diagram showing an example of the details of the information included in the job submitted from the PC 31A in the above-described case. In this embodiment, image data 201 (in which tint image data 202 has been already combined) of a document that is to be printed, a tint image identifier 203, and scaling factor information 204 for scaling are transmitted to the MFP 100.

The MFP 100 receives a submitted job (S110), and acquires the scaling factor information 204 (S102). Then, the MFP 100 acquires the threshold scaling factors from the tint image data 202 (or the tine image identifier 203) (S103), and if the scaling factor is not less than the upper limit scaling factor (S104: YES) or not more than the lower limit scaling factor (S104: NO, S105: YES), then it keeps the printer unit 14 from printing images (S106).

It should be noted that the above-described comparison between the scaling factor and the threshold scaling factors can also be carried out by an external apparatus, such as the PC 31A, which serves as the apparatus for instructing job submission. For example, the processes of Step S104 and S105 described above may be performed with a print instruction program that is installed on the PC 31A. If the scaling factor is not less than the upper limit scaling factor or not more than the lower limit scaling factor, the PC 31A may provide a notification indicating to that effect, and perform a process such as prompting for a change of the scaling factor or the tint data, or refusing to submit a job. One example of the method for providing such a notification is a message indication. This notification may also be carried out with the MFP 100 providing a message indication or voice output, for example.

The above-described process can also be applied to a case where an instruction to print image data in which a tint image has been combined and that has been already stored in the box 231 is given to the MFP 100. That is, the threshold scaling factors may be acquired from the combined tint image, and printing may be inhibited if it is judged that the tint performance cannot be maintained as a result of carrying out the comparing processes in Steps S104 and S105.

(1-4) Details of Image Combining Process (2)

Figure 9:
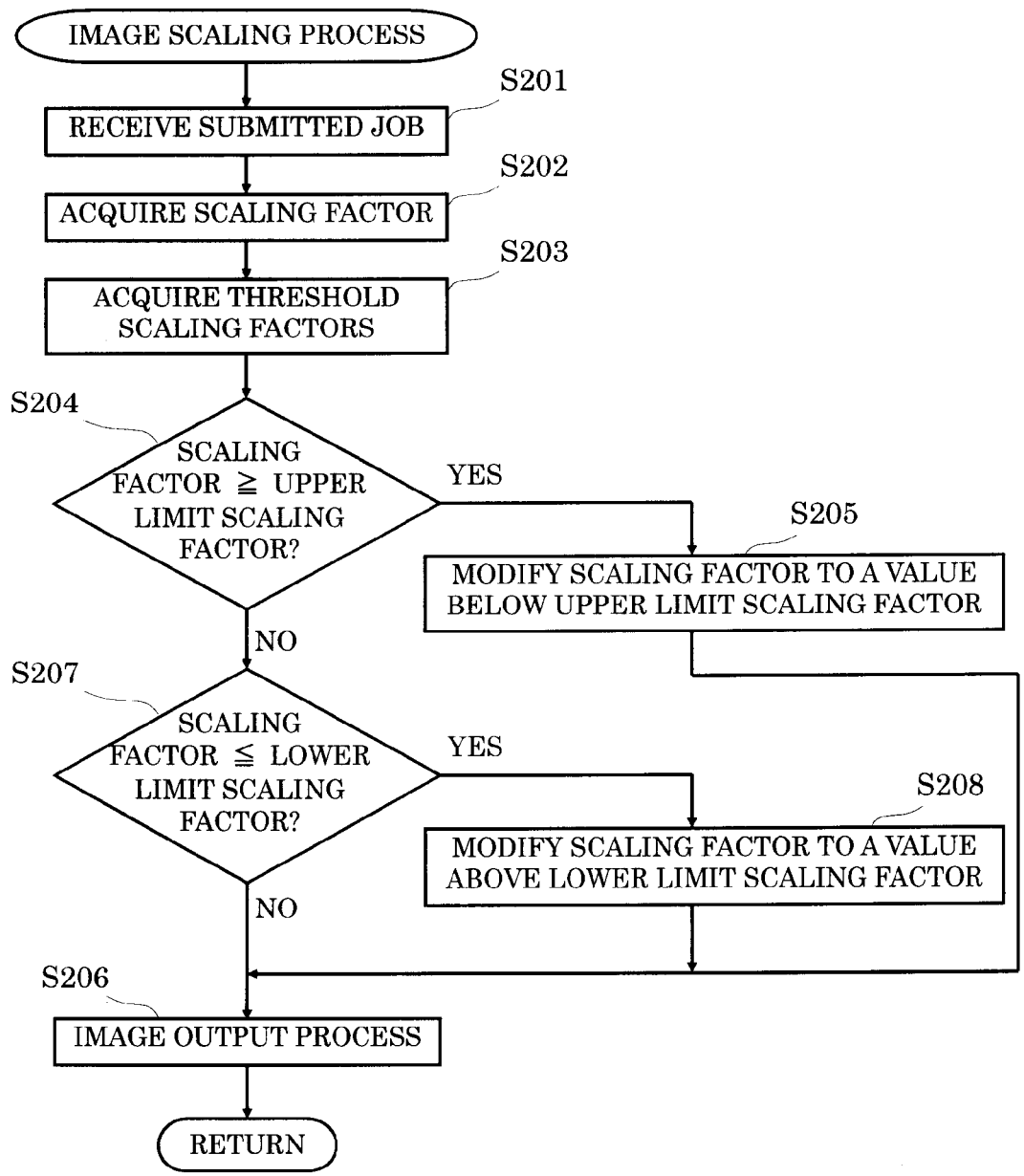
FIG. 9 is a flowchart illustrating another example of the details of an image data scaling process.

Next, another example of the details of the process performed by the image combining unit 130 will be described. FIG. 9 is a flowchart illustrating another example of the details of an image data scaling process. In the example shown in the drawing, the MFP 100 modifies the scaling factor such that the tint performance can be maintained. That is, the MFP 100 receives a submitted job (S201), and acquires the scaling factor information 204 (S202). Then, it acquires the threshold scaling factors from the tint image data 202 (or the tint image identifier 203) (S203). If the scaling factor is not less than the upper limit scaling factor (S204: YES), then the MFP 100 modifies the scaling factor to a value below the upper limit scaling factor (S205), and provides this to the printing process (S206).

If the scaling factor is not more than the lower limit scaling factor (S204: NO, S207: YES), then the MFP 100 modifies the scaling factor to a value above the lower limit scaling factor (S208), and provides this to the image printing process performed by the printer unit 14 (S206).

The above-described process can also be performed by an external apparatus such as the PC 31A, which submits jobs. The external apparatus may automatically modify the scaling factor, or may display a confirmation screen indicating that the scaling factor will be modified. Further, the above-described process can also be applied when an instruction to print image data in which a tint image has been combined and that has been already stored in the box 231 is given to the MFP 100.

(1-5) Details of Image Combining Process (3)

Figure 10:
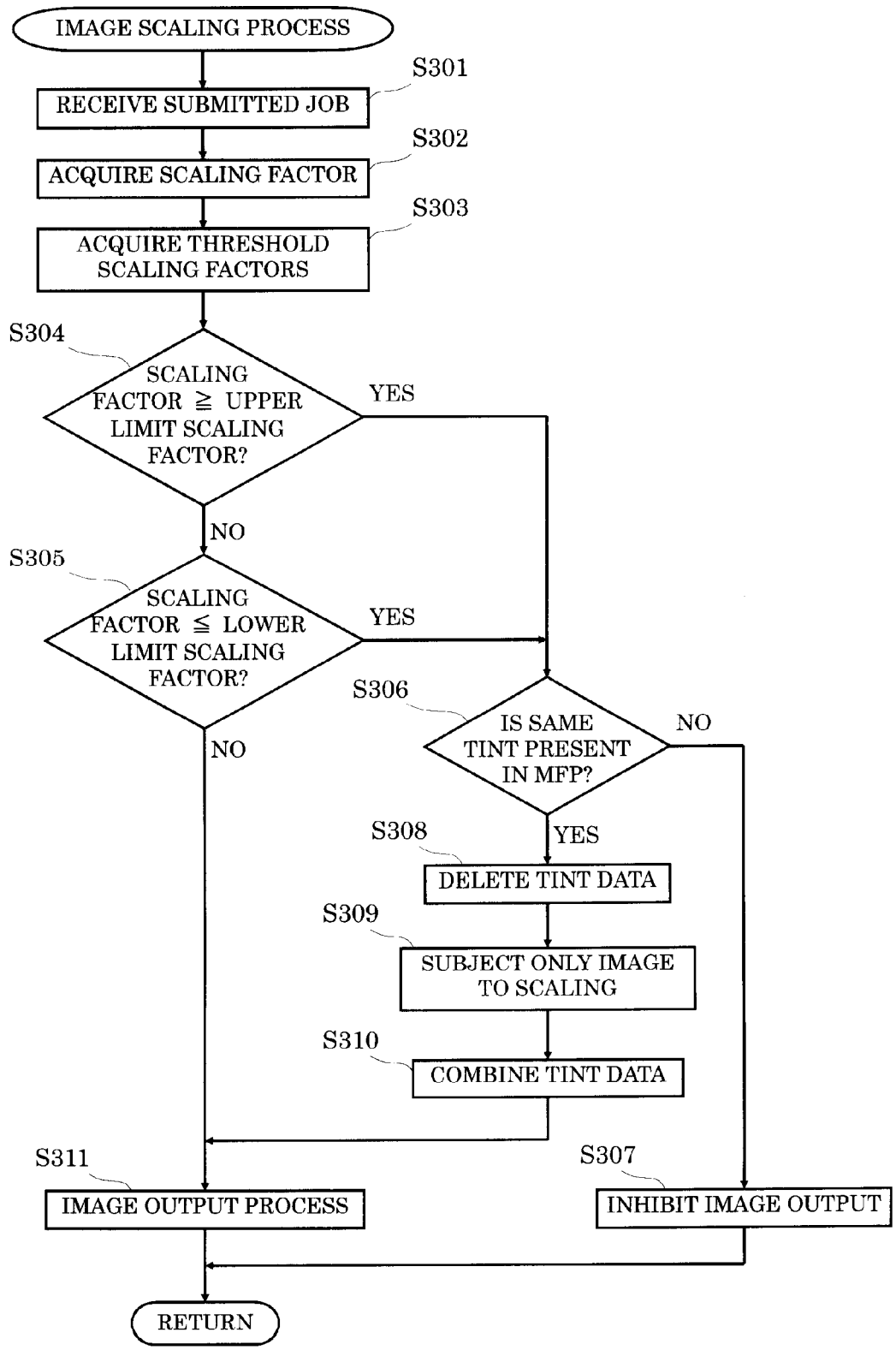
FIG. 10 is a flowchart illustrating another example of the details of an image data scaling process.
Figure 11:
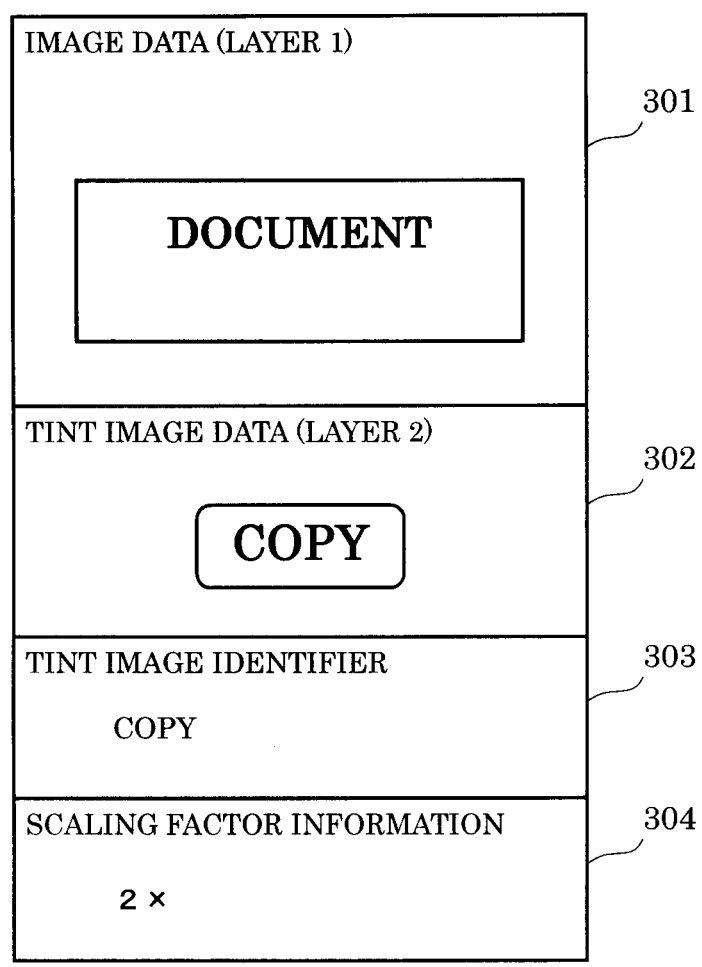
FIG. 11 is a diagram showing an example of the details of the information included in a job when image data (Layer 1) and tint image data (Layer 2) have been already combined into different layers.

Next, another example of the details of the process performed by the image combining unit 130 will be described. FIG. 10 is a flowchart illustrating another example of the details of an image data scaling process. In the example shown in the drawing, the image combining unit 130 receives a submitted job including image data in which a tint image has been combined (S301). FIG. 11 is a diagram showing an example of the contents included in the job in this case. As shown in the drawing, tint image data has been already combined in a layer (Layer 2) that is different from the image data layer (Layer 1). In the case of performing such a printing job, the contents of the tint image storing unit 232 within the MFP 100 are not usually referred to, so that both the image and the tint image will be enlarged by two times if scaling is performed directly referring to the scaling factor information 304.

In this embodiment, the image combining unit 130 acquires the scaling factor and the threshold scaling factors (S302, S303), and if the scaling factor is not less than the upper limit scaling factor (S304: YES) or not more than the lower limit scaling factor (S304: NO, S305: YES), then it judges whether the same tint data is present in the tint image storing unit 232 within the MFP 100 (S306).

If the same tint data is not present in the tint image storing unit 232 (S306: NO), then the image combining unit 130 does not allow printing (S307). On the other hand, if the same tint data is present in the tint image storing unit 232 (S306: YES), then it deletes the tint data in the above-described Layer 2 (S308). Then, the image combining unit 130 performs scaling only for the image data of the document or the like (S309), and combines the image data with the tint image stored in the tint image storing unit 232 (S310). Specifically, the image combining unit 130 acquires a tint pattern from the tint image storing unit 232, using the tint identifier 303 (see FIG. 11) included in the job as a key, and combines the tint pattern with the image data that has been subjected to scaling.

By performing the printing process (S311) after the above-described combining process, it is possible to prevent the tint performance from being impaired by scaling. In addition to the case where the image data and the tint image have been already combined in separate layers when the job is submitted as in the example shown in FIG. 11, there are some other cases where it is possible to separate the image data and the tint image at the MFP 100. With a structure of performing this separating process, it is possible to apply the above-described processing details even if the image data of the submitted job is in a JPEG format or the like, instead of a PDF format or the like, which may include a plurality of layers.

(1-6) Details of Image Combining Process (4)

Figure 12:
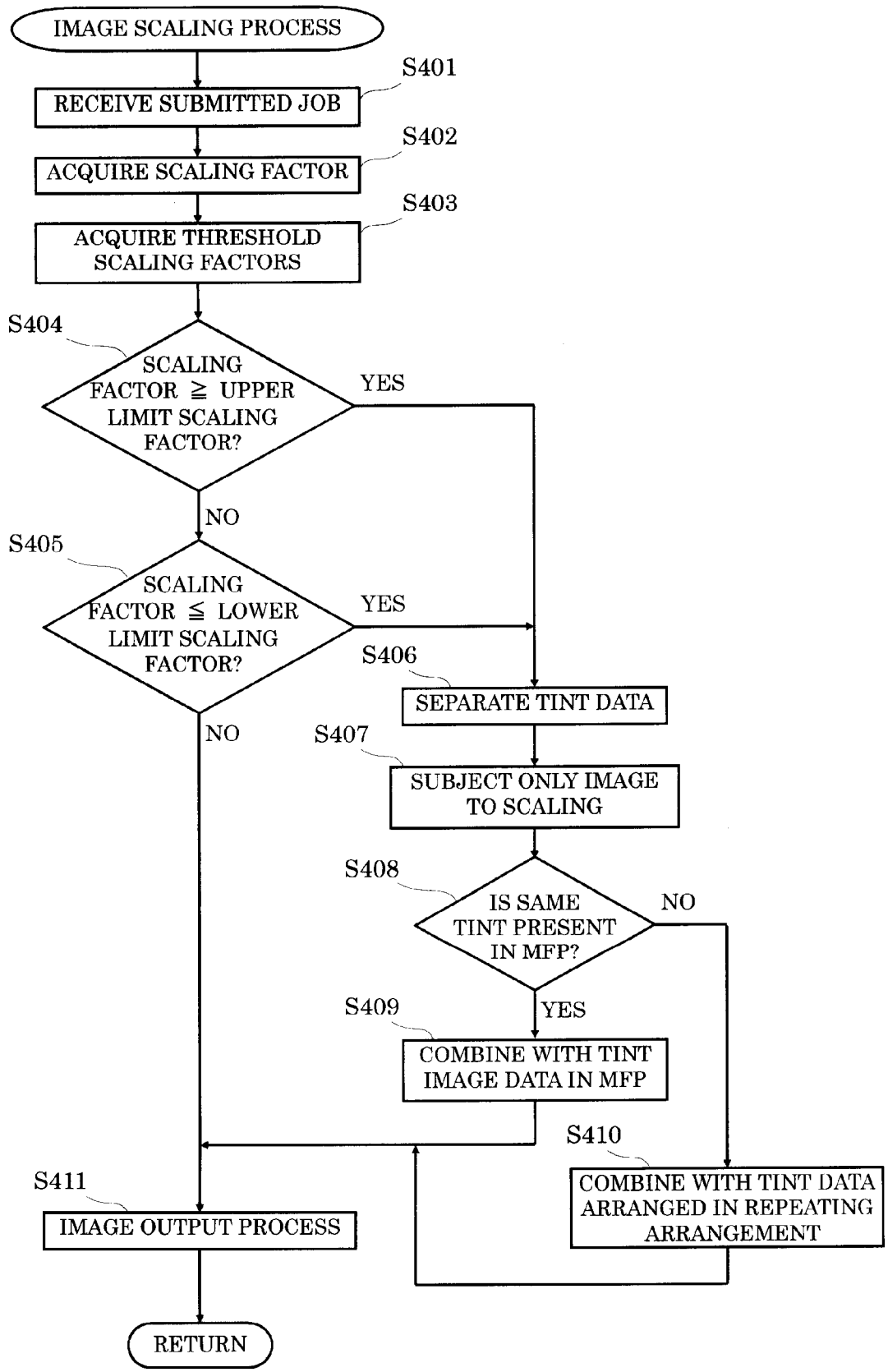
FIG. 12 is a flowchart illustrating another example of the details of an image data scaling process.

Further, another example of the details of the process performed by the image combining unit 130 will be described. FIG. 12 is a flowchart illustrating another example of the details of an image data scaling process. In the example shown in the drawing, the image combining unit 130 also receives a submitted job including image data in which tint data has been combined as in the example shown in FIG. 11 (S401). In this embodiment, the image combining unit 130 acquires the scaling factor and the threshold scaling factors (S402, S403), and if the scaling factor is not less than the upper limit scaling factor (S404: YES) or not more than the lower limit scaling factor (S404: NO, S405: YES), it separates the tint image data and the image data (S406), and performs scaling only for the image data of the document or the like (S407).

Next, the image combining unit 130 judges whether the same tint image data is present in the tint image storing unit 232 within the MFP 100 (S408). If the same tint image data is present in the tint image storing unit 232 (S408: YES), it combines the image data with the tint image stored in the tint image storing unit 232, as in Step S310 shown in FIG. 10 (S409). On the other hand, if the same tint image data is not present in the tint image storing unit 232 (S408: NO), it arranges the tint image data separated in Step S406 in a repeating arrangement, and combines this with the image data (S410).

Figure 13:
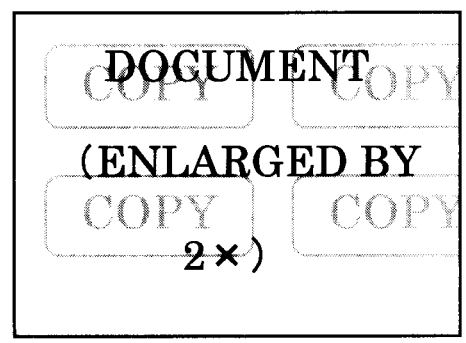
FIG. 13 is a diagram showing an example of an image with which a tint image arranged in a repeating arrangement is combined.

By performing the printing process (S411) after the above-described combining process, it is possible to prevent the tint performance from being impaired by scaling. FIG. 13 is a diagram showing an example of an image that has been subjected to the process of Step S410. In this image, a document that has been enlarged by two times is combined with a tint image that has not been subjected to scaling but has been arranged in a repeating arrangement.

In addition to the case where the image data and the tint image are combined in separate layers as in the above-described example (e.g. PDF format) shown in FIG. 11, there are some other cases where the separating process of Step S406 can separate the image data and the tint image when the image data is in a JPEG format or the like. Further, the above-described process can be performed when an image that has been temporarily stored in the box 231 is printed with the MFP, in addition to when a job is submitted from the outside. In this case, it is possible to print the image even with an MFP that does not have the tint image combining function such as the tint image storing unit 232.

Embodiment 2

Next, a second embodiment of the present invention will be described. In this embodiment, an embodiment of the present invention in which a virtual sub network is constructed from a plurality of MFPs will be described.

(2-1) Configuration of Virtual Sub Network System

Figure 14:
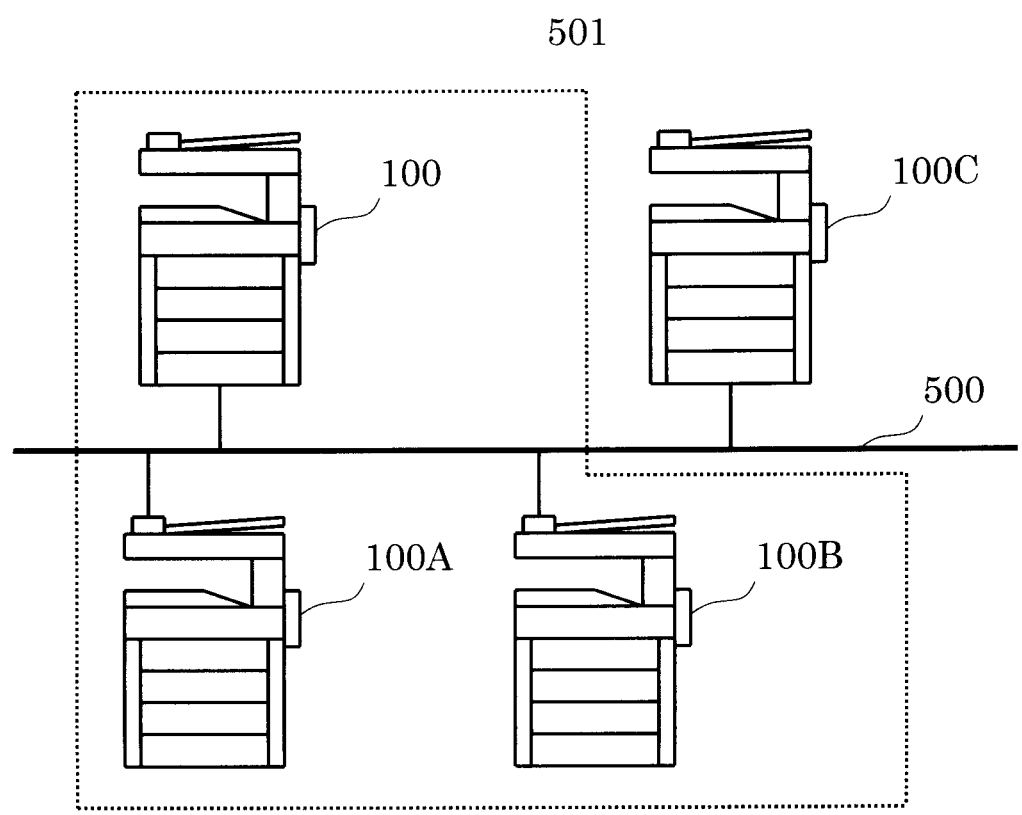
FIG. 14 is a diagram illustrating the configuration of a virtual sub network according to a second embodiment.

FIG. 14 is a diagram illustrating the configuration of a virtual sub network 501 according to this embodiment of the present invention. In the example shown in the drawing, MFPs 100, 100A, 100B and 100C are connected to the network 500.

In this embodiment, the MFP 100, the MFP 100A and the MFP 100B are in the same work group, and these three MFPs constitute the virtual sub network 501. The MFP 100C is in a different work group, and is not part of the virtual sub network 501. The virtual sub network 501 can be formed, for example, by exchanging work group information among image processing apparatuses with broadcast packets, and forming a virtual sub network by the image processing apparatuses in the same work group. It should be noted that any number of MFPs may constitute the virtual sub network 501.

In the virtual sub network 501 according to this embodiment, each of the MFPs 100, 100A and 100B has been already assigned to its main user. Accordingly, each of the MFPs 100, 100A and 100B stores registered user information for registering the main user. The registered user information, which will be described later, includes at least a user identifier for identifying the user.

In this embodiment, an MFP in which the registered user information of a user is stored is referred to as the "home terminal" of that user. For example, if the registered user information of a user "David" is stored in the MFP 100, then the home terminal of the user "David" is the MFP 100. It should be noted that the purpose of storing the registered user information in each of the MFPs 100, 100A and 100B is to improve the operability by specifying the main user in advance, and not to prevent the use of the MFPs by a user whose registered user information is not stored on the MFPs.

Here, let us assume that the MFP 100 is newly connected to the network 500 when the MFPs 100A and 100B have been already connected to the network 500, thus forming the virtual sub network 501. It is necessary to set apparatus identification information for identifying the MFP 100 and the above-described registered user information for the MFP 100. After the apparatus identification information and the registered user information are set for the MFP 100, the MFP 100 transmits the apparatus identification information and the registered user information to the remaining MFPs 100A and 100B. Thus, the virtual sub network 501 is constructed among the MFPs 100, 100A and 100B.

Figure 15:
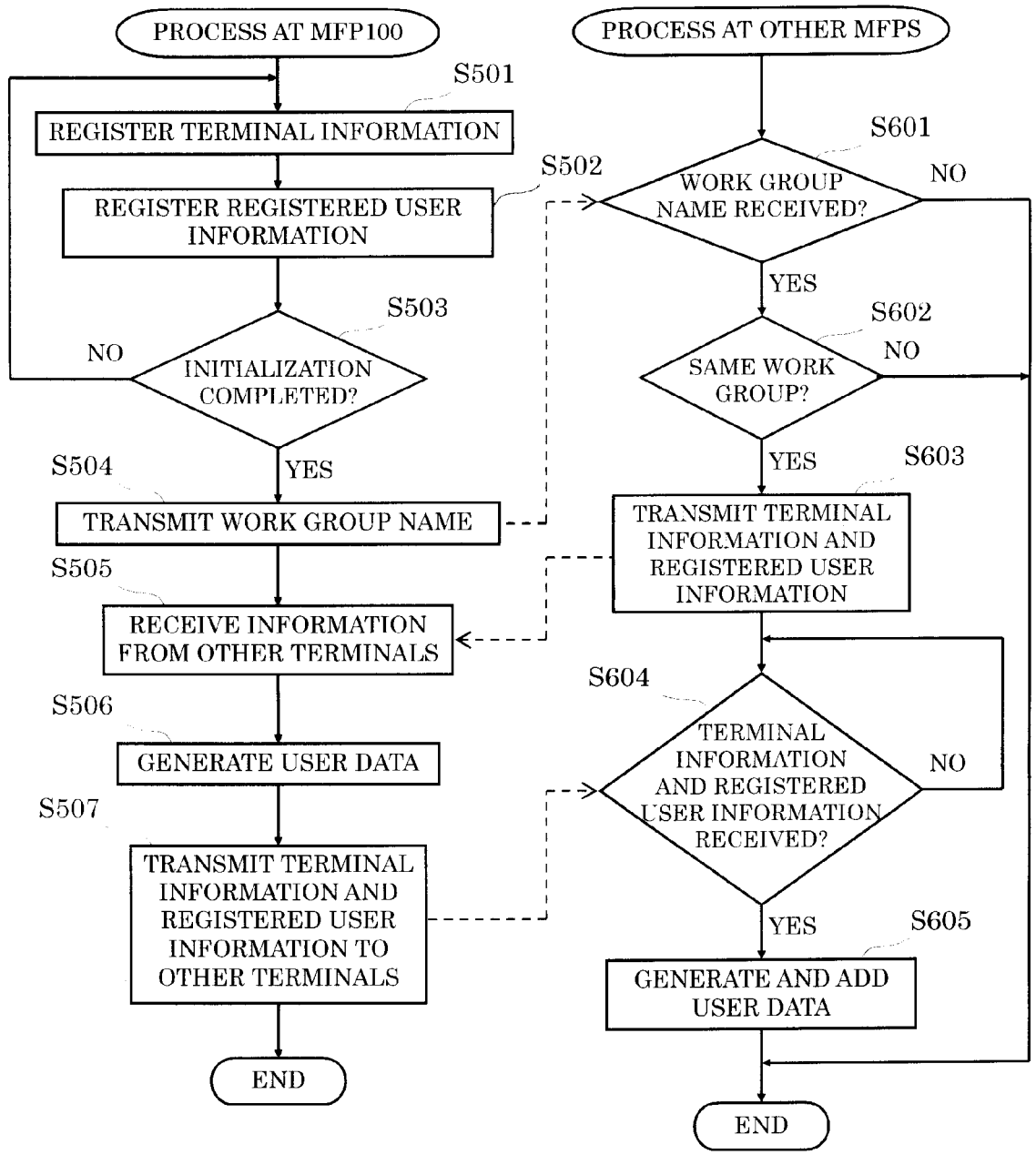
FIG. 15 is a flowchart illustrating the details of processes performed by a newly connected MFP and other MFPs.

The details of the processes performed at the time of constructing the virtual sub network 501 will be specifically described below, taking the MFP 100 as an example. FIG. 15 is a flowchart illustrating the details of the processed performed by the newly connected MFP 100 and the remaining MFPs.

Prior to construction of the virtual sub network 501, terminal information is registered in the MFP 100 first (S501). The terminal information includes apparatus identification information for identifying the MFP 100 and the work group name. Preferably, the apparatus identification information is information of the location assigned to the MFP 100 in the network 500, and it is possible to use an IP address, for example. Next, the registered user information of the user who uses the MFP 100 as the home terminal is input into the MFP 100 (S502). When a plurality of users use the MFP 100 as the home terminal, the registered user information of each of the plurality of users is input.

The registered user information includes a user identifier for identifying the user. The user identifier may be any information that is unique to each user, including, for example, a user ID constituted by characters or symbols, or a user name. In this embodiment, a user name is used as the user identifier. The registered user information includes personal information of each user, in addition to the user identifier. The personal information of a user is information relating to that user, including, for example, accompanying information, an address book, a panel setting information, authentication information and history information. When the virtual sub network 501 is constructed, these pieces of personal user information are used for allowing a user to log in to the virtual sub network 501 by accessing, and to operate other MFPs in the same manner as the user operates its home terminal, thus improving the operability.

The above-described terminal information and registered user information are input by a user operating the operating unit 11. Specifically, an input screen for the terminal information and that for the registered user information are displayed on the display unit 12, and a user inputs the terminal information and the registered user information by operating the operating unit 11 in accordance with instructions on these screens. It should be noted that the terminal information is usually registered by the administrator of each terminal, whereas the registered user information is usually input by a user.

Thereafter, it is judged whether initialization has been completed at the MFP 100 (S503), and if initialization has not been completed, then the process returns to Step S501. If initialization has been completed (S503: YES), the MFP 100 transmits the work group name to the terminals other than the MFP 100 by broadcast (S504).

Upon receiving the work group name transmitted from the MFP 100 (S601: YES), the remaining terminals, such as the MFP 10A, connected to the network 500, judge whether the work group name is the same as the work group name set for them (S602). If it is the same work group (S602: YES), then they transmit the terminal information and the registered user information that are set for them to the MFP 100 (S603). It should be noted that since the MFP 100C has a different work group name, it does not transmit its terminal information and the like to the MFP 100. Thus, the virtual sub network 501 is constructed among the terminals having the same work group name.

The MFP 100 receives the information transmitted from the terminals (the MFP 100A and the MFP 100B) in the same work group (S505), and generates user data (S506). Then, it transmits the terminal information and the registered user information that have been registered in the MFP 100 at the time of initialization (S507). Upon receiving the terminal information and the registered user information that have been transmitted from the MFP 100 (S604: YES), the remaining terminals (the MFP 100A and the MFP 100B) generate user data for the MFP 100, and add it to user data that they already have (S605). In this embodiment, the user data generated by each of the MFP 100 and the remaining terminals is a combination of the apparatus identification information and the user identification information of the main user of each of the MFPs 100, 100A and 10GB, and therefore includes the apparatus identification information and the user identifier of the main user of each terminal. The user data generated by each of the MFPs is stored in the hard disk. By the above-described process, the same user data is stored in the MFPs 100, 100A and 10GB.

Although registration of the terminal information and input of the registered user information were performed in the initialization process performed by the MFP 100 in this embodiment, a process similar to this initialization process may also be performed for adding a user when the MFP 100 has been already connected to the network 500. In that case, the process of registering the terminal information of Step S501 is omitted.

Further, regardless of whether the MFPs 100, 101A and 100B are connected to the network 500, the initialization process may be performed after supplying power to the MFPs 100, 100A and 100B, or may be performed at predetermined time intervals. This enables, for example, the MFP 100 to acquire the registered user information of users who have been newly registered in the remaining MFPs 100A and 10GB, thus storing updated user information. In this case, the MFP 100 sends a request to transmit the registered user information to the terminals having the same work group name, such as the remaining MFPs 10A, 100B and the like, instead of performing the initialization process of Step S501 through S503 shown in FIG. 15.

In response to this transmission request, the remaining MFPs 100A and 100B perform the process shown in FIG. 15, and transmit the registered user information stored in their hard disks in accordance with the transmission request received from the MFP 100. Accordingly, even if the registered user information stored in each of the remaining MFPs 100A and 100B has been changed, user data is generated based on the changed registered user information, and stored in the hard disk 23 of the MFP 100.

FIGS. 16A to 16C are diagrams illustrating the registered user information. FIG. 16A is a diagram showing an example of the registered user information registered in the MFP 100, and FIG. 16B is a diagram showing an example of the registered user information registered in the MFP 10A. FIG. 16C is a diagram showing an example of the registered user information registered in the MFP 100B. FIG. 17 is a diagram showing an example of the user data.

The registered user information according to this embodiment includes a number, user identifier and personal user information. The personal user information includes accompanying information, an address book, a panel setting information, authentication information, and history information. The accompanying information is information unique to each user, including, for example, the name of the division to which the user belongs, the electronic mail address assigned to the user, and the facial image data obtained by taking a picture of the face of the user.

The address book is information including information of parties that have been registered by the user and to which the user can make a transmission, and examples include the user identifier, the electronic mail address and the facsimile number of users to whom a transmission is made. It may include the initial setting for the method for making a transmission to each of the registered users (e.g. a specification designating transmission via electronic mails or facsimile transmission as the transmission method in the initial setting).

The panel setting information includes information of the initial panel setting displayed on a display unit that may be customized by the user. The authentication information is information used for user authentication at the time of logging in to the virtual sub network 501. Here, a password is used as the authentication information. With the MFP 100 and the like according to this embodiment, log-in at the time of using the virtual sub network 501 and log-in to a single MFP can be performed separately, and the authentication information used at the time of logging in to the virtual sub network 501 is managed separately from the password used at the time of logging in to a single MFP.

In the case of logging in to the virtual sub network 501, it is possible to use facial image data as the authentication information. As other examples of biometrics authentication, it is possible to use, for example, a finger print, a voice print, an iris or a vein pattern as the authentication information. The history information is data that is generated in the MFPs 100, 100A and 100B when users instruct the MFPs 100, 100A and 100B to perform processing, and includes the details of the instruction. If the instruction is, for example, an instruction to transmit an electronic mail, then the details of the instruction include information indicating that the instruction is for electronic mail transmission, a transmission destination (mail address), and contents of the electronic mail. It should be noted that the user data shown in FIG. 17 includes a number, the user identifier, and the apparatus identification information of the home terminal.

As described above, the same user data is generated and stored in the MFPs 100, 100A and 100B, which have the same work group name. Thus, the virtual sub network 501 constituted by the MFPs 100, 100A and 100B is formed. When the virtual sub network 501 is formed, a user who uses any one of the MFPs 100, 100A and 100B as the home terminal can be determined based on the user data. Accordingly, when the user operates a terminal other than the home terminal, the user can fetch the personal user information recorded in its home terminal into that terminal using the user data.

(2-2) Image Data Transmission Via Virtual Sub Network 501

An embodiment of the present invention will be described below, in which the present invention is applied when the above-described virtual sub network 501 is constructed. Specifically, a user registered in the virtual sub network 501 can transmit image data to the box in its own home terminal from MFPs other than its own home terminal. When scaling of the image data is specified in this case, there are cases where the tint performance of a tint image may be affected, although this depends on the functions of destination MFPs. This embodiment addresses such cases.

Figure 18:
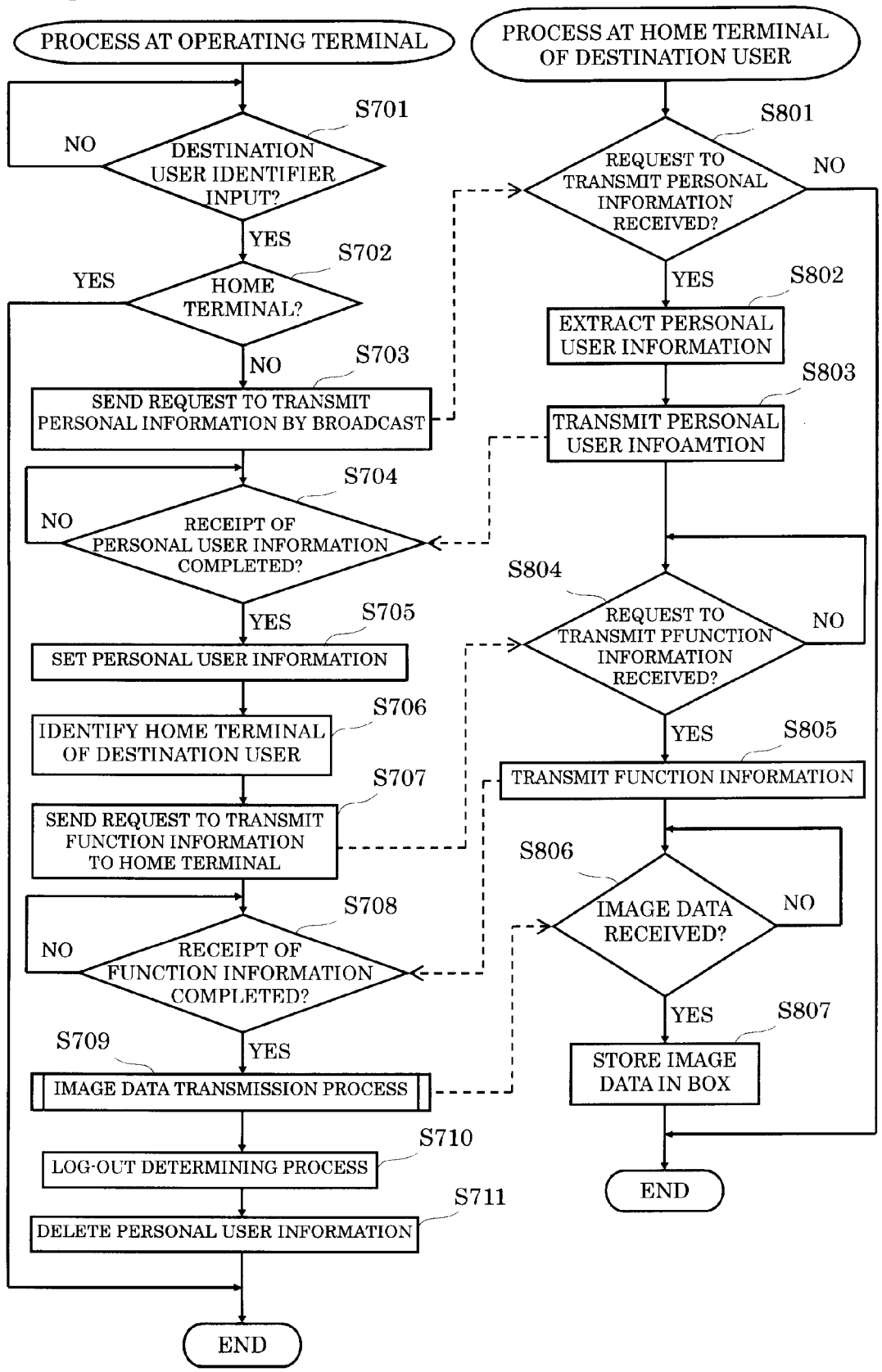
FIG. 18 is a flowchart showing an example of the flow of processes performed at an operating terminal and a home terminal.

FIG. 18 is a flowchart showing an example of the flow of the processes performed at an operating terminal and a home terminal according to this embodiment. The flowchart on the left side of the drawing shows the flow of the process performed at the operating terminal serving as the apparatus that transmits image data, whereas the flowchart on the right side shows the flow of the process performed at the home terminal, which is the transmission destination of the image data. In the operations to the virtual sub network 501 according to this embodiment, the user identifier of a user that is the destination of the image data is first input into the MFP 100 serving as the operating terminal (Step S701). Here, a case will be described where the image data is transmitted to the home terminal of a user having the identifier "Julie". If the user identifier is input (S701: YES), then the process advances to Step S702, and if not, the process enters a standby state.

In Step S702, it is judged whether the operating terminal is the home terminal of the user based on the input user identifier. That is, the user data stored in the hard disk 23 of the operating terminal is searched for using the user identifier, and it is judged whether the apparatus identification information stored in association with the user identifier is the apparatus identification information assigned to the operating terminal. In this embodiment, the process is terminated if the operating terminal is the home terminal of the user. This is because the same process used in the first embodiment can be applied when the operating terminal is the home terminal. Here, since the MFP 100 is not the home terminal of the user having the user identifier "Julie", the process will advance to Step S703.

In Step S703, a request to transmit the personal user information is sent by broadcast to the MFPs constituting the virtual sub network 501. This transmission request includes at least the user identifier. On the other hand, at the MFP 100A, which is the home terminal of the user having the user identifier "Julie", it is judged whether a request to transmit the personal user information has been received (Step S801), and if the transmission request has been received, then the process advances to Step S802.

In Step S802, the registered user information stored in the hard disk of the MFP 100A is searched for using the user identifier included in the received transmission request, and the personal user information stored in association with that user identifier is extracted. Then, the extracted personal user information is transmitted to the operating terminal that has sent the transmission request (Step S803).

At the operating terminal, the process is in a standby state until the personal user information is received from the home terminal in response to the transmission request for the personal user information sent in Step S703 (S704: NO), and if the personal user information of the user having the user identifier "Julie" is received from the MFP 10A, which is the home terminal, then the process advances to Step S705 (S704: YES). In Step S705, the personal user information received in Step S704 is stored in the RAM 22.

In Step S706, the terminal information of the MFP 10A, which is the home terminal of the destination user "Julie", is identified, and a request to transmit the function information is sent to the home terminal of "Julie" (S707). At the MFP 10A, if a request to transmit the function information is received (S804: YES), then the function information is transmitted (S805). The function information transmitted in this embodiment information as to whether the MFP 100A is provided with the tint image combining function, and information relating to the type of the tint image stored in the tint image storing unit of the MFP 100A if the MFP 100A is provided with the tint image combining function.

Figure 19:
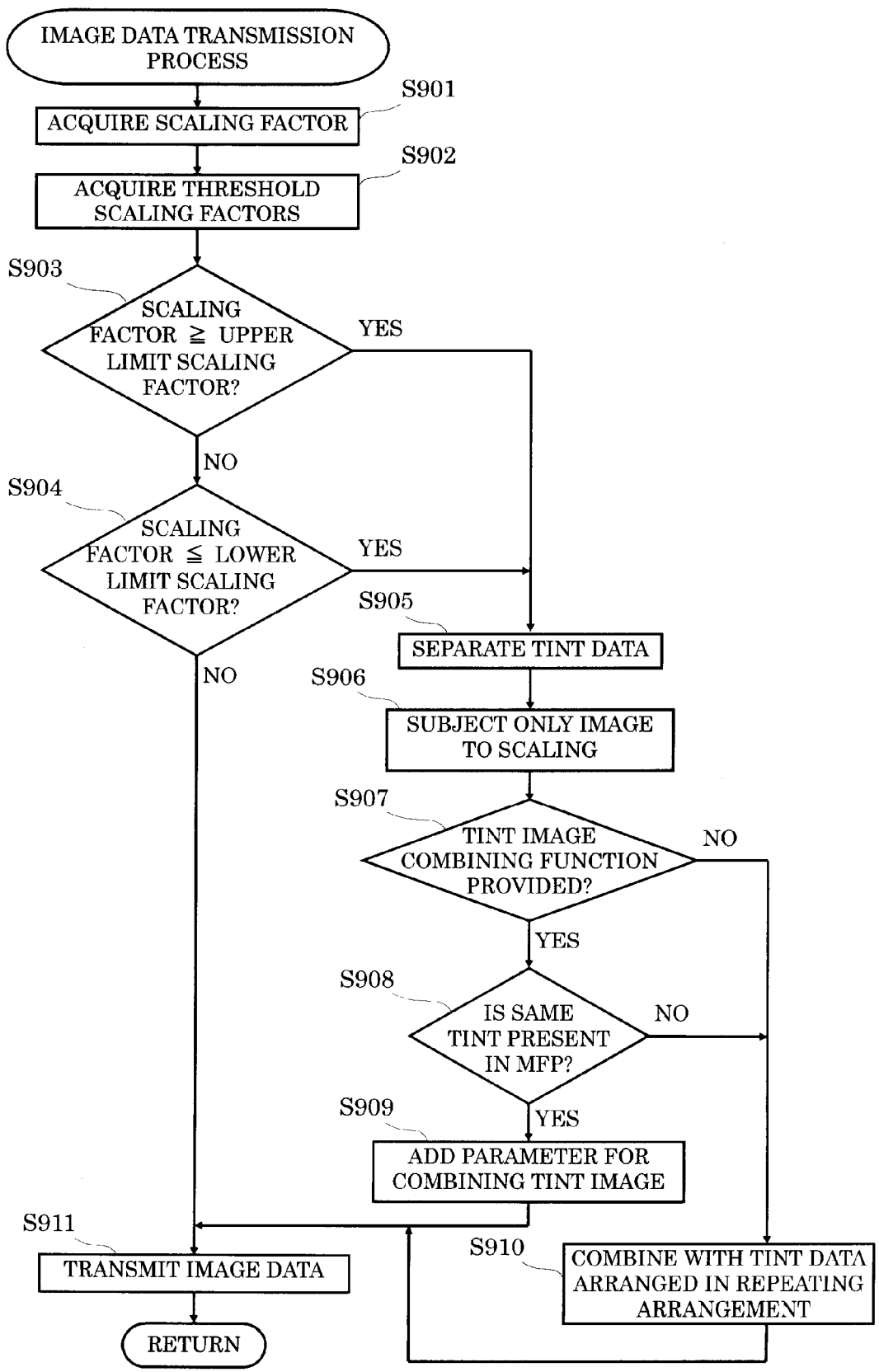
FIG. 19 is a flowchart illustrating an example of the details of an image data transmission process.

At the MFP 100, which is the operating terminal, if the function information transmitted is received from the MFP 100A (S708: YES), then a process of transmitting image data is performed (S709). FIG. 19 is a flowchart illustrating an example of the details of the process of transmitting image data.

The process of transmitting image data is partly the same as that described in the first embodiment. That is, the scaling factor specified as the scaling factor of image data that is to be transmitted and the threshold scaling factors of the tint image included in the image data are acquired (S901, S902). If the scaling factor is within the upper and lower limits (S903: NO, S904: NO), then the image data is directly transmitted to the MFP 100A, which is the home terminal (S911).

If the scaling factor is not less than the upper limit scaling factor (S903: YES) or not more than the lower limit scaling factor (S904: YES), then the tint image data is separated (S905), and the image data other than the tint image is subjected to scaling (S906).

Next, it is judged whether the MFP 100A is provided with the tint image combining function, by referring to the function information transmitted from the MFP 100A (S907). If the destination terminal is not provided with the tint image combining function (S907: NO), then the tint image is arranged in a repeating arrangement, and is combined with the image data other than the tint image (S910).

If the MFP 100A is provided with the tint image combining function (S907: YES), then it is judged whether the same tint image is stored in the MFP 100A (S908), and if the same tint image is not stored, then the process advances to Step S910 (S908: NO). If the same tint image is stored, then parameters for combining the tint image are generated such that the tint image combining process can be performed at the MFP 100A, and the parameters are attached to the image data (S909). Then, the image data is transmitted to the MFP 100A (S911).

Referring back to the flowchart of FIG. 18, if the image data transmitted from the MFP 100 is received in Step S806, and the receipt is completed (S806: YES), then the received image data is stored in the box of the MFP 100A (S807). On the other hand, at the MFP 100, it is judged whether a log out instruction is given (S710), and if a log out instruction is given, then the personal user information stored in the RAM in Step S705 is deleted (S711), and the process is terminated.

MODIFIED EXAMPLE

In the foregoing, the embodiments of the present invention have been described, but the present invention is of course not limited to the specific examples illustrated in the above embodiments, and a modified example as shown below can be contemplated, for example.

That is, the threshold scaling factors are determined in order to prevent, for example, the problem that the background area (the area having a larger printing resolution value) of a tint image does not disappear appropriately when an image printed after being subjected to scaling is printed. However, there may also be a problem in that the concealed character area, which should be essentially printed such that it cannot be recognized with a casual glance, is printed such that it can be recognized when an image subjected to scaling is printed. In order to prevent such a problem, it is possible to set the scaling factor in a range that would not cause such an unexpected problem of concealed characters appearing, at the time of determining the above-described threshold scaling factors. In the case of performing such a process, it is possible to assess the possibility that the concealed characters will appear, for example, based on the density of the background area and the concealed character area of a tint image, or the appearance of the boundary of these two areas.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An image processing apparatus comprising:
   printing equipment that prints an image on a recording sheet;
   an image data scaling circuit that scales image data including a tint image in which a concealed character appears from its background area after scanning by a scanner, and outputs the scaled image data to the printing equipment;
   a scaling factor acquiring unit that acquires a scaling factor specified for scaling performed by the image data scaling circuit;
   a tint image storing unit that stores predetermined tint images having patterns;
   a scaling appropriateness judging unit that judges based on a printing resolution of the tint image, a printing resolution of the background area and a scanning resolution of the scanner, when the image data is subjected to scaling with the scaling factor, whether there is a possibility that the form of the tint image will be inappropriate; and
   an image data processing controller that, if the scaling appropriateness judging unit judges that there is a possibility that the form of the tint image will be inappropriate, prevents the form of the tint image from being inappropriate by judging whether a pattern of the tint image is the same as a pattern of one of the predetermined tint images stored in the tint image storing unit, and if the pattern of the tint image is the same as a pattern of one of the predetermined tint images, lets the image data scaling circuit perform scaling only on the image data and then combines the one of the predetermined tint images stored in the tint image storing unit with the scaled image data.

2. The image processing apparatus according to claim 1, wherein the scaling appropriateness judging unit judges whether there is a possibility that a concealed character will not appear appropriately when an image that is printed after scaling is scanned.

3. The image processing apparatus according to claim 2, wherein, when the larger of the printing resolutions (dpi) of a concealed character area and a background area that are included in the tint image is X1 (dpi), a scanning resolution (dpi) of a presumed scanner is Y, and the acquired scaling factor is R1, then the scaling appropriateness judging unit judges that there is a possibility that a concealed character will not appropriately appear, if $R1 \geq X1/Y$ is satisfied.

4. The image processing apparatus according to claim 2, wherein, when the smaller of the printing resolutions (dpi) of a concealed character area and a background area that are included in the tint image is X2 (dpi), a scanning resolution (dpi) of a presumed scanner is Y, and the acquired scaling factor is R2, then the scaling appropriateness judging unit judges that there is a possibility that a concealed character will not appropriately appear, if $R2 \leq X2/Y$ is satisfied.

5. The image processing apparatus according to claim 1, wherein the image data processing controller controls the printing equipment so as not to perform image forming processing if the scaling appropriateness judging unit judges that there is a possibility that the form of the tint image will be inappropriate.

6. The image processing apparatus according to claim 1, wherein the scaling appropriateness judging unit comprises an upper limit scaling factor acquiring unit that acquires an upper limit scaling factor,
   the upper limit scaling factor being a threshold value of a scaling factor at which the possibility of the form of the tint image being inappropriate arises when enlarging the tint image, and
   wherein, if the scaling factor is not less than the upper limit scaling factor, the image data processing controller modifies the scaling factor for preventing the form of the tint image from being inappropriate and lets the image data scaling circuit perform scaling.

7. The image processing apparatus according to claim 1,
wherein the scaling appropriateness judging unit comprises a lower limit scaling factor acquiring unit that acquires a lower limit scaling factor,
the lower limit scaling factor being a threshold value of a scaling factor at which the possibility of the form of the tint image being inappropriate arises when reducing the tint image, and
wherein, if the scaling factor is not more than the lower limit scaling factor, the image data processing controller modifies the scaling factor for preventing the form of the tint image from being inappropriate and lets the image data scaling circuit perform scaling.

8. The image processing apparatus according to claim 1,
wherein the image data processing controller comprises
a tint image separating unit that separates the tint image from the image data if the scaling appropriateness judging unit judges that there is a possibility that the form of the tint image will be inappropriate, and
lets the image data scaling circuit scale a portion other than the separated tint image.

9. The image processing apparatus according to claim 8,
wherein, if the image data is in a file format in which the tint image and other images are in separate layers, the tint image separating unit separates the tint image from the image data by separating the layer of the tint image.

10. The image processing apparatus according to claim 8,
wherein the image data processing controller further comprises a tint image combining unit that combines the tint image with an image of a portion other than the tint image that has been subjected to scaling.

11. The image processing apparatus according to claim 10,
wherein the tint image combining unit combines the tint image stored in the tint image storing unit with an image of a portion other than the tint image that has been subjected to scaling.

12. The image processing apparatus according to claim 11,
wherein the tint image combining unit comprises
a tint image determining unit that determines a form of the separated tint image, and,
when a tint image having the determined form is stored in the tint image storing unit, combines that stored tint image with an image of a portion other than the tint image.

13. The image processing apparatus according to claim 10,
wherein the tint image combining unit comprises
a tint image repeating arrangement unit that arranges the separated tint image in a repeating arrangement, and combines the tint image arranged in a repeating arrangement with an image of a portion other than the tint image.

14. The image processing apparatus according to claim 1,
further comprising
a notifying unit that provides a notification if the scaling appropriateness judging unit judges that there is a possibility that the form of the tint image will be inappropriate.

15. An image processing method comprising:
obtaining image data including a tint image in which a concealed character appears from its background area after scanning by a scanner,
a scaling factor acquiring step of acquiring a scaling factor for image data scaling;
storing predetermined tint images having patterns;
a scaling appropriateness judging step of judging based on a printing resolution of the tint image, a printing resolution of the background area and a scanning resolution of the scanner, when the image data is subjected to scaling with the scaling factor, whether there is a possibility that the form of the tint image will be inappropriate; and
if the scaling appropriateness judging step judges that there is a possibility that the form of the tint image will be inappropriate, processing steps of:
preventing the form of the tint image from being inappropriate by judging whether a pattern of the tint image is the same as a pattern of one of the stored predetermined tint images, and if the pattern of the tint image is the same as a pattern of one of the predetermined tint images, performing image data scaling only on the image data and combining the one of the stored predetermined tint images with the scaled image data.

16. The image processing method according to claim 15,
further comprising
a halting step of halting a subsequent image processing process if the scaling appropriateness judging step judges that there is a possibility that the form of the tint image will be inappropriate.

17. The image processing method according to claim 15,
further comprising
a separating step of separating the tint image from the image data if the scaling appropriateness judging step judges that there is a possibility that the form of the tint image will be inappropriate.

* * * * *